United States Patent [19]

Mayumi et al.

[11] 4,260,445
[45] Apr. 7, 1981

[54] PROCESS FOR PRODUCING THICK REINFORCED PLASTIC ARTICLES

[75] Inventors: Masakatsu Mayumi, Osaka; Kenji Mitooka; Sigeharu Fujiwara, both of Okayama, all of Japan

[73] Assignee: Sekisui Kagaku Kogyo Kabushiki Kaisha, Japan

[21] Appl. No.: 931,915

[22] Filed: Aug. 8, 1978

[30] Foreign Application Priority Data

Aug. 9, 1977 [JP] Japan .................. 52-95730

[51] Int. Cl.³ ............................................ B32B 31/00
[52] U.S. Cl. .................................... 156/276; 156/332; 156/313; 264/112; 428/430; 428/36; 428/86
[58] Field of Search .............. 156/276, 279, 242, 243, 156/332, 313; 264/112, 113, 115; 428/430, 480, 323, 392, 365

[56] References Cited

U.S. PATENT DOCUMENTS 3,547,726  12/1970  Tangorra .......................... 156/276

Primary Examiner—George F. Lesmes
Assistant Examiner—E. Rollins Buffalow
Attorney, Agent, or Firm—Wenderoth, Lind & Ponack

[57] ABSTRACT

A process for producing a thick reinforced plastic article by laminating unit layers of a molding material composed of a thermosetting resin and a reinforcing material, which comprises scattering fibers on the surface of an earlier disposed unit layer while it is in the uncured state, then curing the unit layer, and laminating the next layer on the cured unit layer.

7 Claims, 5 Drawing Figures

PROCESS FOR PRODUCING THICK REINFORCED PLASTIC ARTICLES

This invention relates to an improvement in a process for producing a thick reinforced plastic article by a laminating method.

When in the laminating method, the required number of unit layers of thermosetting resin prepreg are first laminated and then cured all at a time, cracks and dimensional changes may occur in the resulting product, and adjacent unit layers are likely to separate from each other. Furthermore, the intense heat generated may degenerate the resin. It is necessary therefore to repeat an operation which comprises laminating one unit layer and then curing it, and then laminating the next unit layer on the cured layer. But the product so made is likely to have a reduced adhesion strength between an earlier laminated unit layer and the unit layer laminated next. Attempts have been made to increase this adhesion strength by applying an adhesive to the surface of a unit layer disposed earlier and cured and then laminating the next unit layer on it; or by sanding the surface of a unit layer disposed earlier and cured to expose part of the glass fibers in the unit layer and then laminating the next unit layer on the sanded surface. In the case of the first-mentioned method, timing of the molding is restricted depending upon the characteristics of the adhesive, and the characteristics of the adhesive also limit the utility of the final product. In the latter case, the operation is complicated, and when a large area is to be bonded, the method is difficult to carry out.

It is an object of this invention therefore to provide a thick reinforced plastic article having the individual unit layers bonded firmly to one another by an easy and simple operation without involving the aforesaid defects of the prior art.

This object can be achieved in accordance with this invention by a process for producing a thick reinforced plastic article by laminating unit layers of a molding material composed of a thermosetting resin and a reinforcing material, which comprises scattering fibers, preferably glass fibers, on the surface of an earlier disposed unit layer while it is in the uncured state, then curing the unit layer, and laminating the next layer on the cured unit layer.

The molding material composed of thermosetting resin and reinforcing material used as a unit layer in the process of this invention may be any material conventionally used in the field of fiber-reinforced plastics (FRP), and needs not to be special. The most suitable molding material for use in the invention is a fabric such as a mat made of glass fibers or other fibers in which a thermosetting resin such as an unsaturated polyester is impregnated together with a curing agent. A so-called resin mortar prepared by mixing a thermosetting resin such as an unsaturated polyester resin with sand or both sand and fibers or a filler together with a curing agent can also be used, in some cases, as a molding material for producing a unit layer.

The essence of the process of this invention resides in the scattering of fibers on a unit layer which is in the uncured state. The fibers used are those obtained by cutting commercial glass fibers to a length of 2 to 50 mm, preferably 5 to 20 mm. The amount of the glass fibers is not particularly restricted so long as it can bring about the result intended by the present invention. However, the effect generally tends to be reduced when the amount is less than 0.1 g per 100 cm$^2$ of the unit layer. The upper limit to the amount is the one in which the uncured resin in the unit layer, by virtue of its adhesive power, can retain the fibers without embedding them in the resin (in other words, the fibers are at least partly adhered to the surface of the unit layer by the resin in a state as if they were implanted in the unit layer). Generally, the upper limit is 2 g per 100 cm$^2$ of the unit layer. Preferably, the fibers are used in an amount of usually 0.3 to 0.8 g per 100 cm$^2$ of the unit layer.

In the next step of the process of this invention, the unit layer on which the fibers have been scattered is cured, and the next unit layer is laminated to the cured layer. While the next layer is still in the uncured state, fibers are scattered onto it, and then the unit layer is cured, in the same way as above. By repeating this operation a required number of times, the desired thick reinforced plastic article can be produced. Needless to say, there if no need to scatter fibers on the uppermost unit layer.

As is clear from the foregoing description, in the process of this invention, fibers are scattered onto the surface of a first unit layer disposed earlier before it is cured. While one end of at least a part of the fibers is being implanted in the unit layer and the other is being exposed as a free end, the unit layer is cured. Then, a second unit layer in the uncured state is laminated to the cured first unit layer. Accordingly, the exposed free end of the fibers comes beneath the undersurface of the second unit layer at this time, and is fixed in position when the second unit layer is cured. Thus, according to the present invention, the adjacent unit layers are bonded by the fibers, and therefore, the resulting thick reinforced plastic article has superior bond strength between the layers and possesses favorable properties which make it apparently seem a unitary structure.

The invention will now be described specifically by reference to one embodiment shown in the accompanying drawings which illustrate the production of a coupling composed of three layers.

Figure 1:
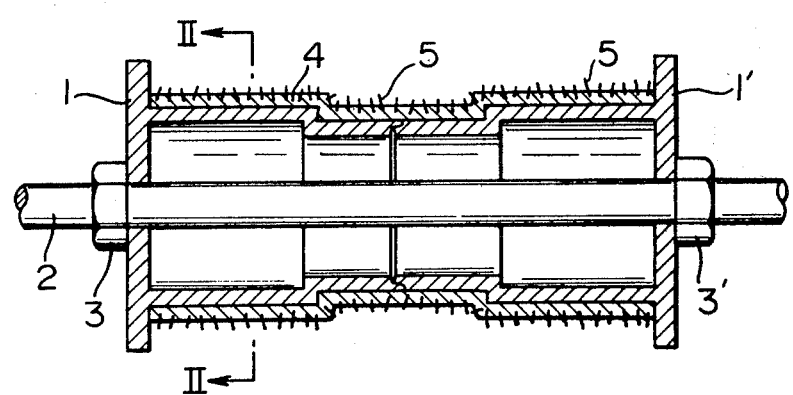
FIG. 1 is a side sectional view showing the step of forming a first unit layer.
Figure 2:
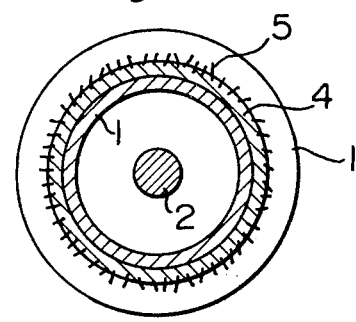
FIG. 2 is a sectional view taken along the line II—II of FIG. 1.
Figure 3:
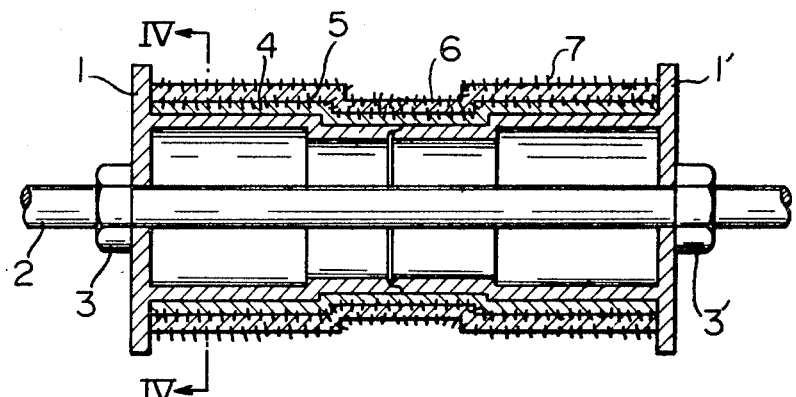
FIG. 3 is a side sectional view showing the step of forming a second unit layer.
Figure 4:
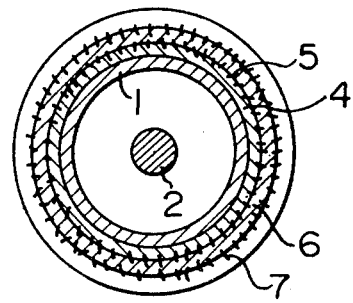
FIG. 4 is a sectional view taken along the line IV—IV of FIG. 3.

In FIGS. 1 and 2, the reference numerals 1 and 1' represent members of a core mold, and are mounted on a support shaft 2 by clamps 3 and 3' respectively. Molding of a socket is performed around the core mold. After the completion of molding, the resulting socket can be separated from the core mold 1, 1' by removing the clamps 3 and 3' from the support shaft 2.

Referring to FIGS. 1 and 2, a molding material 4 made by impregnating a glass fiber mat with an unsaturated polyester resin and a curing agent is wrapped around the core mold 1, 1' to form a first unit layer. Then, while the resin in the molding material 4 is still in the uncured state, glass fiber (a strand composed of 60 monofilaments with a diameter of 9 microns) 5, 6 mm in length, are scattered uniformly over the entire surface of the first unit layer in an amount of 0.4 g/100 cm$^2$ to adhere the glass fibers to the molding material 4 in such a state that one end of at least a part of the fibers is embedded in the resin and the other end is exposed to the outside. Then, the molding material 4 is cured. Thus, as shown in FIGS. 1 and 2, a cured first unit layer 4 having the glass fibers 5 embedded in its surface layer 5 is formed around the core mold 1, 1'. After the curing of the first unit layer 4, a molding material 6 made by impregnating a glass fiber mat with an unsaturated polyester resin and a curing agent is wrapped around the peripheral surface of the first unit layer 4 to form a second unit layer. In the same way as in the formation of the first unit layer, glass fibers 7 are uniformly scattered on its entire surface and then the resin is cured. A cured second unit layer 6 is formed which is bonded to the first unit layer 4 through the glass fibers 5 and has the glass fibers 7 firmly implanted in its surface layer.

Figure 5:
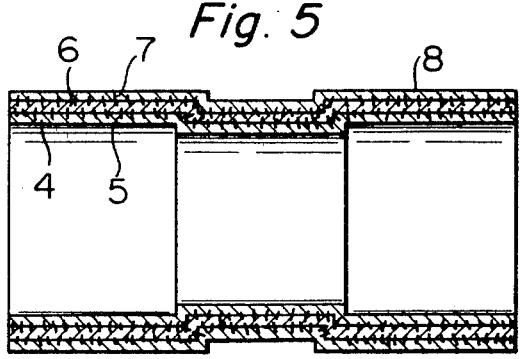
FIG. 5 is a side sectional view of the coupling of the invention obtained after forming a third unit layer.

Finally, a molding material 8 having the same composition as above is wrapped around the peripheral surface of the cured second unit layer 6 and the resin is cured to form a third unit layer 8. In this case, too, as shown in FIG. 5, a firm bond is formed between the third unit layer 8 and the second unit layer 6 through the glass fibers 7.

Whilst the above description has been directed specifically to the production of a coupling as one typical example, it should be understood that the invention can also be applied to the production of a tees, an elbow, a reducer, a cross, and other types of pipe joints which require similar strength and rigorous dimensional stability. Needless to say, the invention is also applicable to the production of ordinary plastic tubes and plastic boards. In some molded articles, the invention can be applied partially, for example to those parts which especially require reinforcement.

The effect of the present invention is demonstrated by the following non-limitative Example.

EXAMPLE

Four plies of a glass fiber chopped strand mat (450, a product of Nittobo Co., Ltd.) impregnated with an unsaturated polyester resin were laminated onto a core mold of the type shown in FIG. 1 which had an outside diameter of 200 mm to form a first unit layer. The first unit layer was cured at room temperature, and on top of it, a second unit layer having the same four plies of the glass fiber chopped strand mat was formed. The second unit layer was cured at room temperature. The resulting molded article is designated as A.

The above procedure was repeated except that before the curing of the first unit layer, a glass fiber chopped strand having a length of 6 mm was scattered onto the first unit layer at a rate of 0.4 g per 100 cm$^2$, and then the first unit layer was cured at room temperature, followed by forming the same second unit layer on the cured first layer and curing the second layer at room temperature. The molded article is designated as B.

Eight plies of the same glass fiber chopped strand mat as above impregnated with an unsaturated polyester resin were laminated on the same core mold at a time without curing, and then these layers were cured at room temperature. The molded article obtained is designated as C.

The openings at both ends of each of the molded articles A, B and C were closed with an iron flange, and they were subjected to a destruction test comprising applying a hydraulic pressure to the inside of each article by a plunger pump. The results are tabulated below.

| Molded article | Destruction strength (kg/cm$^2$) |
| --- | --- |
| A | 46 |
| B | 58 |
| C | 61 |

The results demonstrate that the molded article B of this invention had very much improved strength over the molded article A in which the first unit layer and the second unit layer were both bonded through glass fibers. It is also seen that the strength of the molded article B of the invention was nearly comparable to that of the molded article C which was obtained by laminating the same number of plies of the glass fiber mat at a time and curing them.

What is claimed is:

1. A process for producing a thick reinforced plastic article by laminating unit layers of a molding material composed of a thermosetting resin and a reinforcing material, which comprises scattering fibers on the surface of an earlier disposed unit layer while it is in the uncured state, then curing the unit layer whereby at least a portion of the fibers have exposed free ends, and laminating a second layer which is in the uncured state, on the cured unit layer and then curing said second layer, whereby said free ends become fixed within said second layer.

2. The process of claim 1 wherein the fibers are of glass and are scattered in an amount of 0.1 to 2 g, per 100 cm$^2$ of unit layer.

3. The process of claim 2 wherein the glass fibers have a length of 2 to 50 mm.

4. The process of claim 1 wherein the molding material is a glass fiber mat impregnated with an unsaturated polyester resin.

5. The process of claim 1 wherein the molding material is a resin mortar obtained by mixing an unsaturated polyester resin with sand or both sand and fibers or a filler.

6. The process of claim 2 wherein the fibers are employed in an amount of 0.3 to 0.8 g per 100 cm$^2$ of unit layer.

7. The process of claim 3 wherein the glass fibers have a length of 5 to 20 mm.

* * * * *